(12) United States Patent
Meier et al.

(10) Patent No.: US 7,819,040 B2
(45) Date of Patent: Oct. 26, 2010

(54) METHOD FOR MAKING VEHICLE AXLE DIFFERENTIAL CASING AND RESULTANT PRODUCT

(75) Inventors: Thomas Meier, Rochester Hills, MI (US); Brian M. Nosakowski, Macomb, MI (US)

(73) Assignee: TransForm Automotive LLC, Sterling Heights, MI (US)

( * ) Notice: Subject to any disclaimer, the term of this patent is extended or adjusted under 35 U.S.C. 154(b) by 540 days.

(21) Appl. No.: 11/946,191

(22) Filed: Nov. 28, 2007

(65) Prior Publication Data

US 2009/0137357 A1    May 28, 2009

(51) Int. Cl.
F16H 57/02    (2006.01)
(52) U.S. Cl. ......................................................... 74/607
(58) Field of Classification Search ................... 74/607; 29/893
See application file for complete search history.

(56) References Cited

U.S. PATENT DOCUMENTS

| | | |
|---|---|---|
| 3,523,467 A | 8/1970 | Shachter |
| 4,747,322 A | 5/1988 | Orain |
| 4,959,043 A | 9/1990 | Klotz et al. |
| 6,045,479 A | 4/2000 | Victoria et al. |
| 6,061,907 A | 5/2000 | Victoria et al. |
| 6,176,152 B1 | 1/2001 | Victoria et al. |
| 6,227,024 B1 | 5/2001 | Koestermeier |
| 6,238,316 B1 | 5/2001 | Sturm |
| 6,379,277 B1 | 4/2002 | Victoria et al. |
| 6,434,991 B1 | 8/2002 | Jaschka |
| 6,652,408 B2 | 11/2003 | Rutt et al. |
| 6,840,883 B2 | 1/2005 | Orr et al. |
| 6,983,632 B2 | 1/2006 | Mayfield |
| 7,244,211 B2 * | 7/2007 | Bostbarge ................... 475/230 |
| 2006/0276296 A1 | 12/2006 | Rosochacki et al. |
| 2006/0278036 A1 | 12/2006 | Rosochacki et al. |

* cited by examiner

Primary Examiner—Sherry L Estremsky
Assistant Examiner—Edwin A. Young
(74) Attorney, Agent, or Firm—Brooks Kushman P.C.

(57) ABSTRACT

A method for making a differential gear casing (22) flow forms a first casing half (30) and forms a second casing half (32), both with hemispherical portions (34 and 52) and with radial flanges (36 and 56) with the latter also having an axial projection (58). An interior positioning surface (38) of the first casing half (30) and an exterior positioning surface (60) of the second casing half (32) position the casing halves with respect to each other.

20 Claims, 5 Drawing Sheets

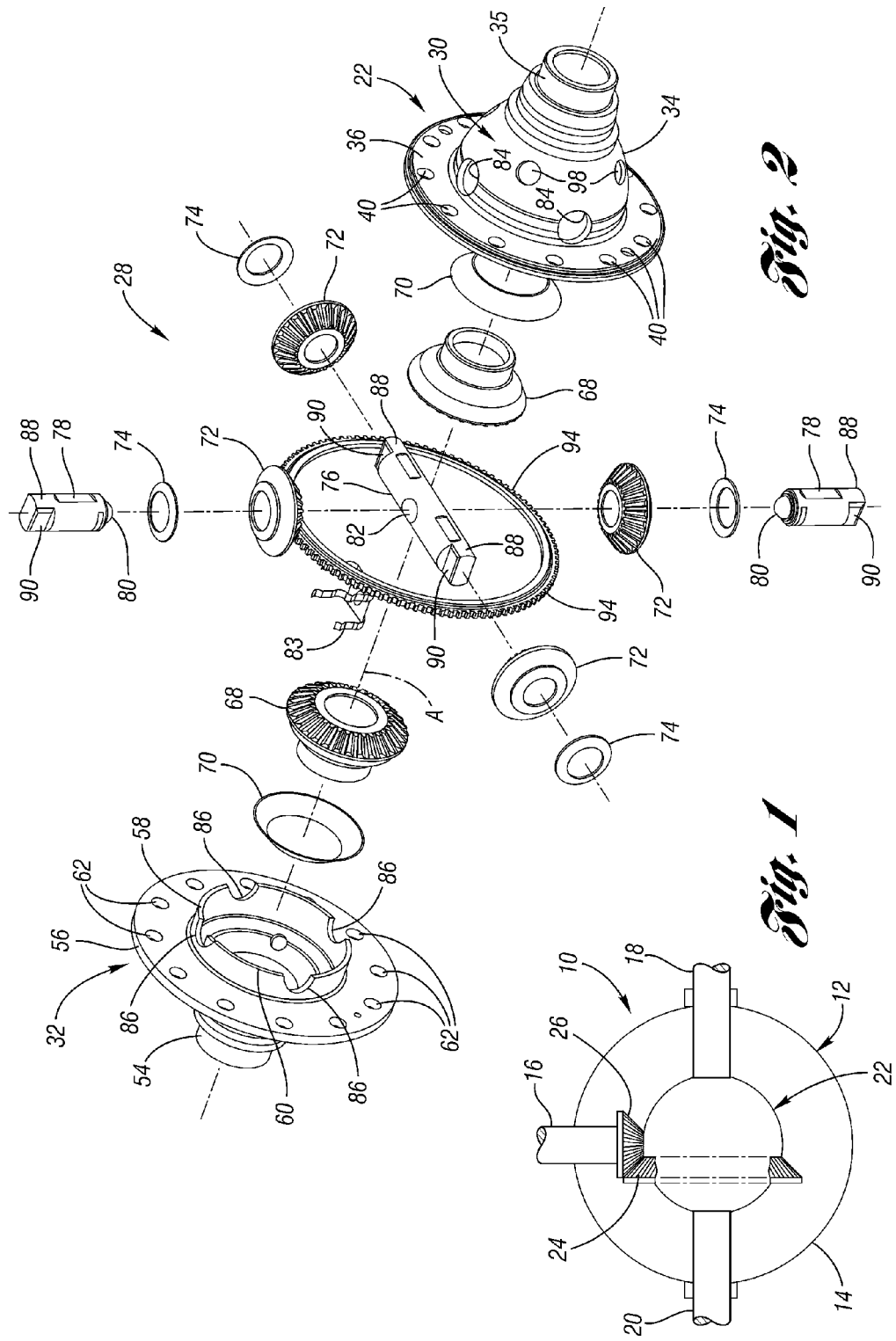

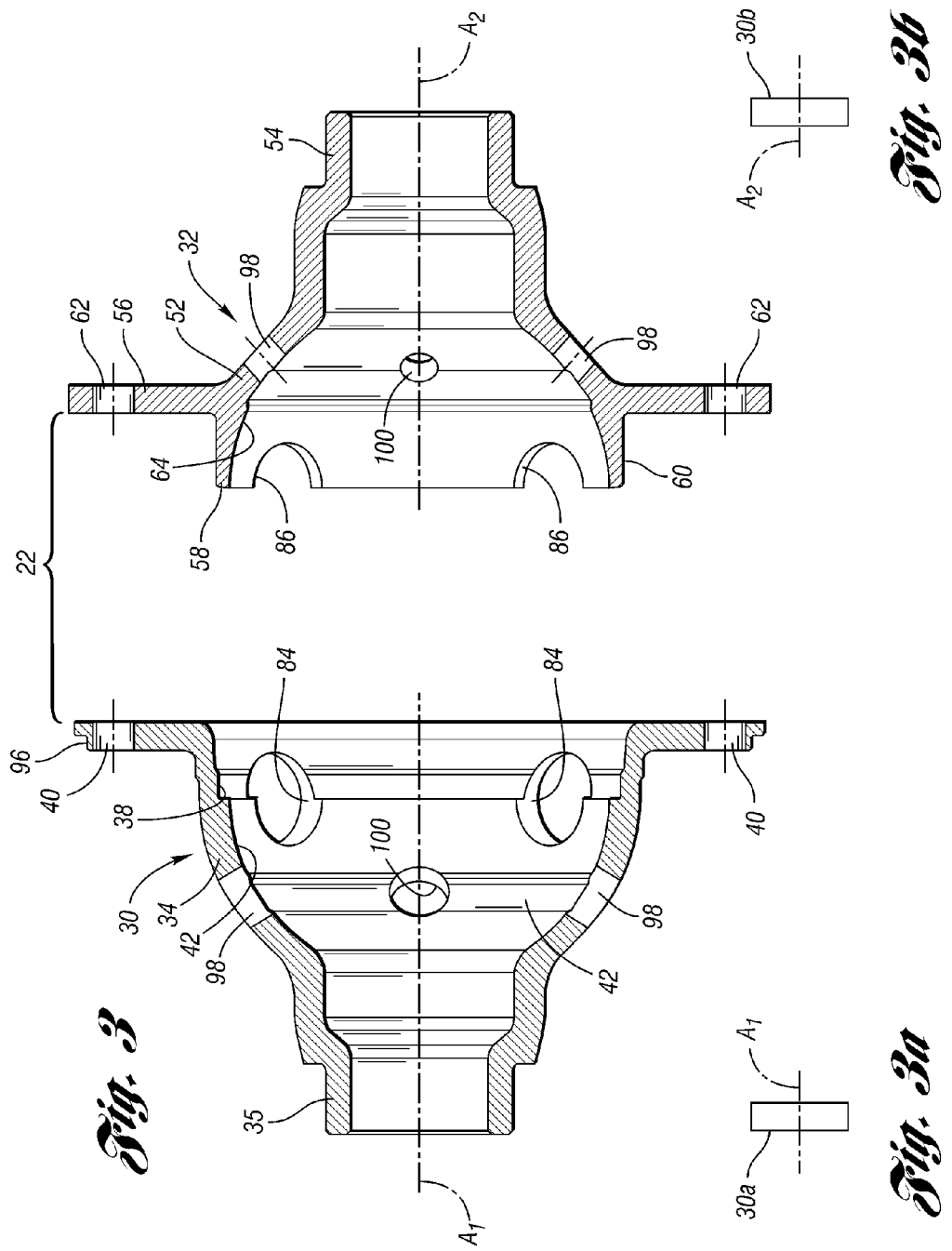

METHOD FOR MAKING VEHICLE AXLE DIFFERENTIAL CASING AND RESULTANT PRODUCT

BACKGROUND OF THE INVENTION

1. Field of the Invention

This invention relates to a method for making a differential gear casing for use in a differential housing of a vehicle axle, and the invention also relates to the resultant differential gear casing.

2. Background Art

Vehicle axles conventionally include differential gearing supported within a gear casing for use in a differential housing of a vehicle axle to permit associated wheels to move at different rates such as when negotiating a turn in the direction of travel. Normally such differential gear casings are made as castings. It has also been proposed to make differential gear casings by hot forging or flow forming although none are known to actually have been so made for actual production.

Prior art references noted during an investigation in connection with the present invention include U.S. Pat. No. 6,045,479 Victoria et al. U.S. Pat. No. 6,061,907 Victoria et al.; U.S. Pat. No. 6,176,152 Victoria et al.; U.S. Pat. No. 6,227,024 Koestermeier; U.S. Pat. No. 6,379,277 Victoria et al.; U.S. Pat. No. 6,434,991 Jaschka; U.S. Pat. No. 6,652,408 Rutt et al; U.S. Pat. No. 6,840,883 Orr et al; and U.S. Pat. No. 6,983,632 Mayfield; and United States Published Patent Applications: US 2006/0276296 Rosochacki et al. and US 2006/0278036 Rosochacki et al.

SUMMARY OF THE INVENTION

An object of the present invention is to provide an improved method for making a differential gear casing for use in a differential housing of a vehicle axle.

In carrying out the above object, the method for making a vehicle axle differential housing gear casing is performed by flow forming a first blank about an associated central axis to provide a first casing half having a generally hemispherical portion, a shaft journal portion extending from the hemispherical portion adjacent one axial extremity thereof along its central axis, and a radial flange extending from the hemispherical portion adjacent the other axial extremity thereof along its central axis. A second blank is formed about an associated central axis to provide a second casing half having a generally hemispherical portion, a shaft journal portion extending from its hemispherical portion thereof adjacent one axial extremity thereof along its central axis, a radial flange extending from its hemispherical portion at a location toward the other axial extremity thereof along its central axis, and with the hemispherical portion including an axial projection having a round cylindrical shape extending axially from the radial flange thereof in a direction away from the journal portion of the second casing half. The first casing half is formed to provide an interior locating surface of a round cylindrical shape adjacent the hemispherical portion thereof, and the axial projection of the second casing half is formed to provide an exterior locating surface of a round cylindrical shape. The radial flanges of the first and second casing halves are formed to provide aligned fastener holes into which fasteners can be inserted to secure the casing halves to each other with the locating surfaces thereof contacting each other to provide positioning of the central axes in alignment with each other.

In performing the method for making a vehicle axle differential housing gear casing, the second casing half is formed as a casting or by hot forging or flow forming.

An annular ring gear is mounted on the radial flange of the first casing half to permit rotational driving. As disclosed, this mounting is performed by threaded fasteners inserted through the fastener holes in the radial flanges of the casings and into the ring gear to secure the radial flanges to each other and to also secure the ring gear to the radial flanges of both casing halves.

In performing the method for making a vehicle axle differential housing gear casing, at least two sets of aligned pinion shaft holes are formed in the first casing half adjacent the radial flange thereof and in the axial projection of the second casing half to respectively receive an associated pair of differential gear pinion shaft ends that are also received by the ring gear. The method disclosed also provides the differential gear pinion shaft ends and the ring gear with complementary positioning formations to provide positioning between these pinion shaft ends and the ring gear. These complementary positioning formations are disclosed as being provided as oppositely facing flat surfaces on each pinion shaft end and as opposed flat surfaces on the ring gear.

The method disclosed also includes mounting a rotational speed sensing gear of an annular shape on the differential gear casing. As disclosed, this mounting of the rotational speed sensing gear is on the differential gear casing between the radial flange of the first casing half and the annular ring gear which is mounted on the radial flange of the first casing half.

Another object of the present invention is to provide an improved differential gear casing for a differential housing of a vehicle axle.

In carrying out the immediately preceding object, the differential gear casing for a differential housing of a vehicle axle includes a first flow formed casing half having a generally hemispherical portion extending around an associated central axis and a shaft journal portion extending from the hemispherical portion adjacent one axial extremity thereof along its central axis, a radial flange extending from the hemispherical portion adjacent the other axial extremity thereof along its central axis, and an interior locating surface of a round cylindrical shape formed within the first casing adjacent its radial flange. A second casing half of the gear casing has a generally hemispherical portion and includes a shaft journal portion extending from the hemispherical portion thereof adjacent one axial extremity thereof along an associated central axis, a radial flange extending from its hemispherical portion at an axially spaced location along its central axis from its journal portion, and an axial projection having a round cylindrical shape extending axially from the radial flange thereof in a direction away from the journal portion of the second casing half and including an exterior locating surface of a round cylindrical shape. The radial flanges of the first and second casing halves include aligned fastener holes into which fasteners can be inserted to secure the casing halves to each other with the locating surfaces thereof contacting each other to provide positioning of the central axes in alignment with each other.

The differential gear casing as disclosed has the second casing half made as a casting or as a forging or a flow formed part.

The differential gear casing disclosed includes an annular ring gear mounted on the radial flange of the first casing half to permit rotational driving of the gear casing. Threaded fasteners extend through the fastener holes in the radial flanges of the casing halves and into the ring gear to secure the radial flanges to each other and to also secure the ring gear to the radial flange of the first casing half.

The differential gear casing disclosed includes at least two sets of aligned pinion shaft holes in the first casing half adjacent the radial flange thereof and in the axial projection of the second casing half, and the differential gear casing also includes at least two differential gear pinion shaft ends respectively extending through associated sets of the aligned pinion holes and also received by the ring gear. The differential gear pinion shaft ends and the ring gear have complementary positioning formations to provide positioning between the pinion shafts and the ring gear. These complementary positioning formations include oppositely facing flat surfaces on the pinion shaft ends and opposed flat surfaces on the ring gear.

The differential gear casing also is disclosed as including a rotational speed sensing gear of an annular shape mounted on the differential gear casing, and as disclosed this speed sensing gear is mounted between the radial flange of the first casing half and the annular ring gear which is mounted on the radial flange of the first casing half within an outer annular groove that receives the speed sensing gear.

The objects, features and advantages of the present invention are readily apparent from the following detailed description of the preferred embodiment for carrying out the invention when taken in connection with the accompanying drawings.

BRIEF DESCRIPTION OF THE DRAWINGS

FIG. 1 is a partial schematic view of a vehicle axle which includes a differential having a housing in which a differential gear casing made by the method of the invention and constructed in accordance with the invention is mounted for use to provide differential gear action.

FIG. 2 is an exploded perspective view of the differential gear casing and associated differential gear components.

FIG. 3 is a sectional view illustrating first and second casing halves made by the method of and constructed in accordance with the invention.

FIG. 3a illustrates a blank from which one casing half is flow formed.

FIG. 3b illustrates a blank from which the other casing half is formed.

DETAILED DESCRIPTION OF THE PREFERRED EMBODIMENT

Figure 4:
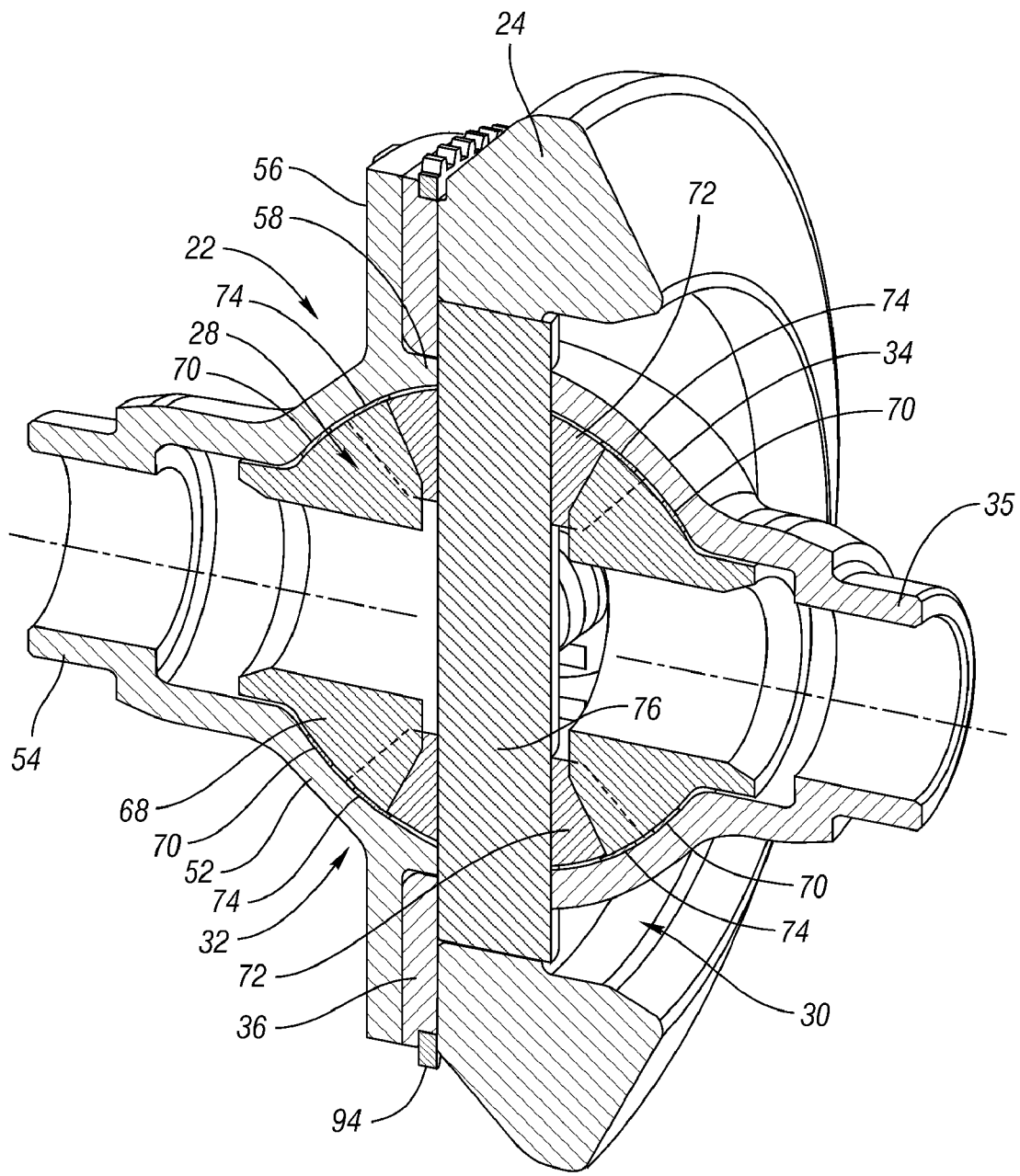
FIG. 4 is a perspective view taken in section through the differential gear casing as viewed angularly from one axial direction.
Figure 5:
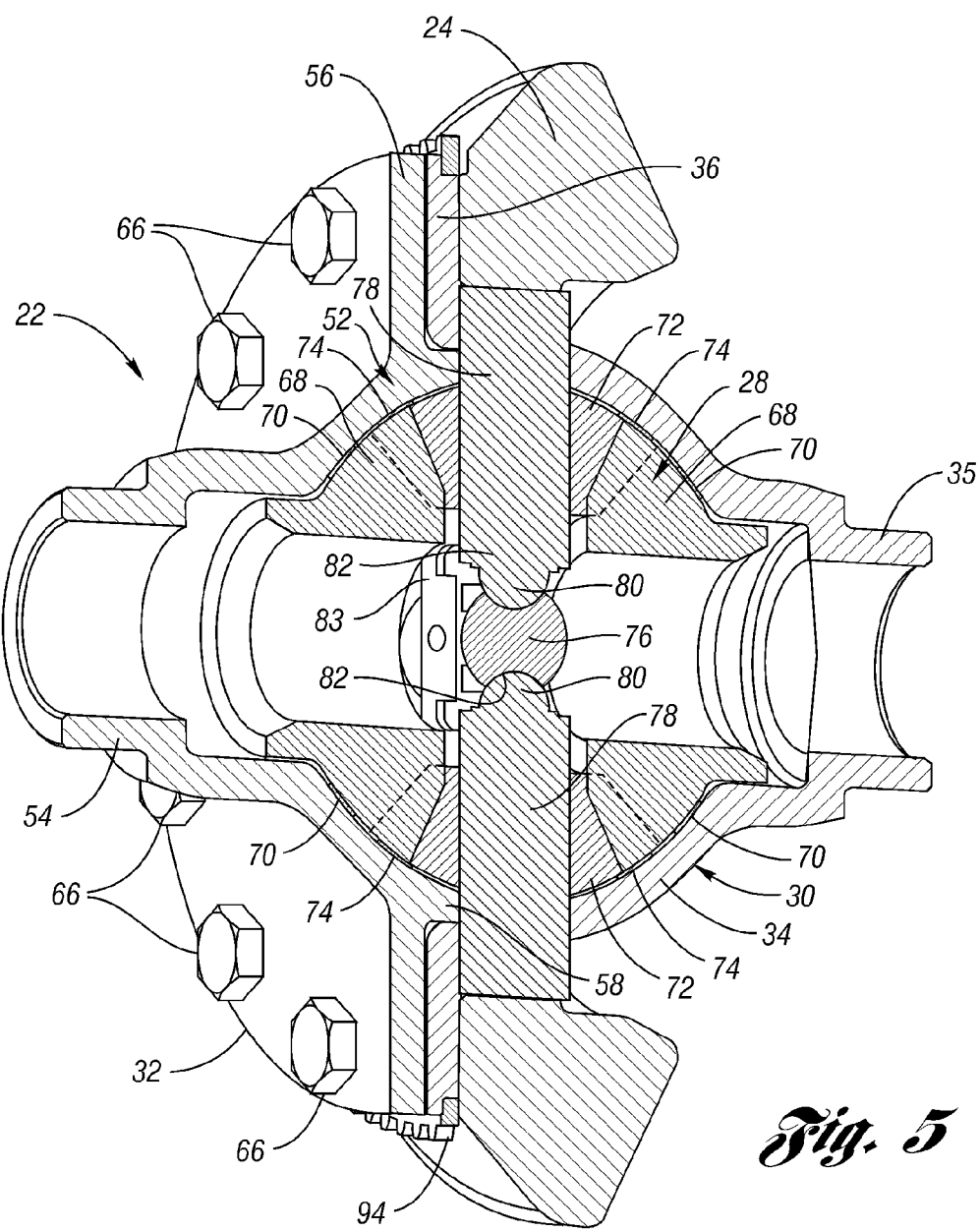
FIG. 5 is another perspective view taken in section through the differential gear casing and viewed angularly from the other axial direction.

With reference to FIG. 1, a partially and schematically illustrated vehicle axle 10 includes a differential 12 having a housing 14 into which a pinion shaft 16 extends and from which a pair of right and left axial half shafts 18 and 20 extend outwardly for driving associated vehicle wheels. A differential gear casing 22 is received within the differential housing 14 and is made by the method of and is constructed in accordance with the present invention as is hereinafter more fully described. The differential gear casing 22 includes an annular ring gear 24 that is rotatively driven by a drive gear 26 on the propeller shaft 16. Differential gearing 28 shown in FIGS. 2, 4 and 5 provide driving of the right and left axial half shafts 18 and 20 shown in FIG. 1. The method for making the differential gear casing 22 and its construction is more fully described below in an integrated manner with each other so as to facilitate an understanding of all aspects of the invention.

As illustrated in FIG. 3, the differential gear casing 22 includes first and second casing halves 30 and 32 that are formed from blanks 30a and 32b as respectively shown in FIGS. 3a and 3b as is hereinafter more fully described with reference to FIG. 7. It should be appreciated that while the blanks 30a and 32b shown in FIGS. 3a and 3B are shown as flat blanks from which the forming takes place, it is also possible to utilize partially preformed blanks.

With reference to FIGS. 2, 3, 3a and 7, the first blank 30a is flow formed to provide the first casing half 30 about an associated central axis $A_1$. More specifically, this flow forming provides the first casing half 30 with a generally hemispherical portion 34, a shaft journal portion 35 through which the associated axle half shaft extends adjacent one axial extremity along the axis $A_1$, and a radial flange 36 extending from the hemispherical portion 34 adjacent the other axial extremity along the central axis $A_1$.

With continuing reference to FIG. 3, the flow formed casing 30 is then formed such as by machining to provide an interior locating surface 38 of a round cylindrical shape adjacent the hemispherical portion 34 at its interior. In addition, fastener holes 40 are formed in the radial flange 36 spaced about its annular shape as also shown in FIG. 2. It should be noted that the flow forming of the hemispherical portion 34 of the first casing half 34 provides its interior surface 42 with a round shape that is sufficiently smooth without further machining to permit sliding of the differential gearing during use as is hereinafter more fully described.

Figure 7:
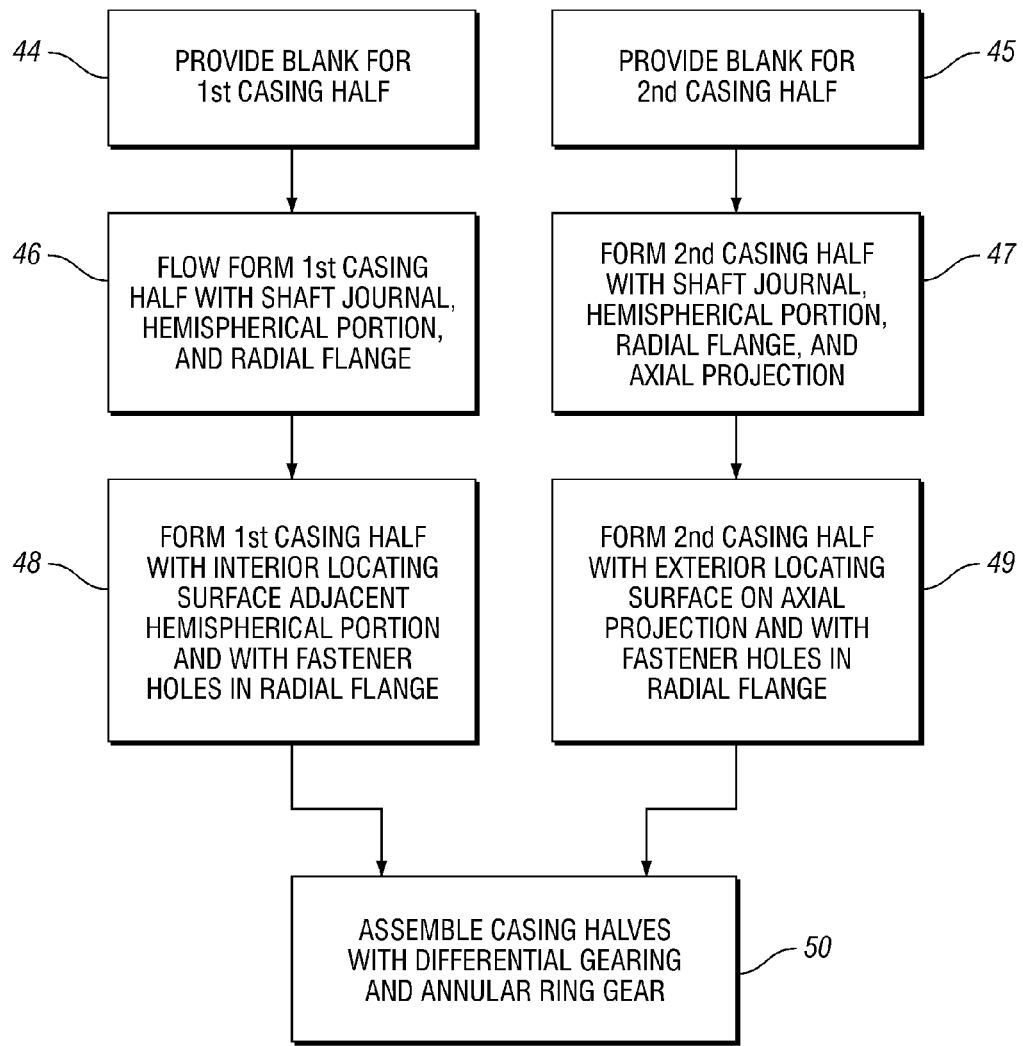
FIG. 7 is a flow chart illustrating the manner in which the differential gear casing is made.

As shown in FIG. 7, the steps of providing 44 the first casing half blank, the flow forming 46 and the subsequent casing forming 48 are illustrated together with providing 45 the second casing half blank, the second casing half forming 47 and the subsequent second casing half forming 49 as described below take place prior to the casing assembly 50.

With reference to FIGS. 3, 3b and 7, the second casing half blank 32b shown in FIG. 3b is initially provided as identified by step 45 in FIG. 7 and then is formed as identified by step 47 in FIG. 7 to provide the casing 32 shown in FIG. 3. This casing 32 has an associated central axis $A_2$ and a generally hemispherical portion 52 extending about that central axis. A shaft journal 54 through which one of the axial half shafts extends as shown in FIG. 1 is adjacent one axial extremity of the casing 32 along its axis $A_2$ as shown in FIG. 3. A radial flange 56 extends from the hemispherical portion 52 at a location toward the other axial extremity thereof along its central axis A from the shaft journal 54, and an axial projection 58 has a round cylindrical shape extending axially from the radial flange 56 in a direction away from the shaft journal portion 54.

After the second casing half forming step 47 shown in FIG. 7, the second casing 32 is formed such as by machining with an exterior locating surface 60 of a round cylindrical shape on its axial projection 58. In addition, fastener holes 62 are formed in the radial flange 56 about its circumference as also illustrated in FIG. 2.

During the casing assembly identified by step 50 in FIG. 7, the differential gearing 28 is positioned within the casings as is hereinafter more fully described and the casing halves 30 and 32 are moved toward each other with the interior locating surface 38 of the first casing half 30 and the exterior locating surface 60 of the second casing half 32 contacting each other with a slight press fit that align their associated axes into a single common axis A of the assembled casing as identified in FIG. 2.

The second casing half 32 may be casting or may be made by hot forging or flow forming. If flow forming is utilized, the interior 64 of the hemispherical portion 52 often will be sufficiently smooth without further machining to permit sliding contact with the differential gearing; however, if it is a casting or hot forged, forming such as by machining is necessary to provide a sufficiently smooth round surface for such sliding contact.

As shown in FIGS. 4 and 5, the annular ring gear 24 is mounted on the differential casing 22, specifically with this mounting having the ring gear mounted on the radial flange 36 of the first casing half 30 and with fasteners 66 extending through the flange fastener openings 40 and 62 shown in FIG. 3 and into the ring gear 24 to also secure the casing halves to each other as well as securing the ring gear.

With reference to FIG. 2, the differential gearing collectively indicted by 28 includes a pair of side gears 68 and associated thrust washers 70 that are received within the first and second casing halves 30 and 32 during the assembly for connection to the axial half shafts utilized with the differential. Four pinion gears 72 illustrated as having associated thrust washers 74 are positioned at 90° intervals with each other about the central axis A, with two supported on a through pinion shaft 76 and the other two respectively supported on a pair of half pinion shafts 78 whose inner ends 80 have ball shapes received by seats 82 in the through pinion shaft 76 and held together during assembly by a clip 83. It should be appreciated that two or three pinion shafts may also be utilized and that the pinon shafts may be of a unitary construction with each other rather than made from multiple pieces as shown.

Figure 6:
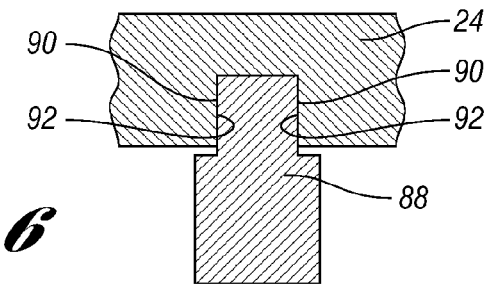
FIG. 6 is a view that illustrates the manner in which pinion shaft ends of the differential gearing are positioned with respect to an annular ring gear of the assembled casing.

As illustrated in FIGS. 2 and 3, the first casing half 30 has four shaft holes 84 in its hemispherical portion 34 extending radially and spaced at 90° intervals about the central axis, and the second casing half 32 has four shaft holes 86 in its axial projection 58 also extending radially and spaced at 90° intervals about the central axis with the semicircular shapes shown. Upon assembly of the casing, the holes 84 and 86 are provided as aligned holes through which the outer ends 88 of the pinion shafts 76 and 80 extend and are received as shown in FIG. 6 by the ring gear 66 for positioning. More specifically, the shaft ends 88 and ring gear 66 have complementary positioning formations provided by oppositely facing flat surfaces 90 on the shaft ends and opposed surfaces 92 on the ring gear. Both the shaft end surfaces 90 and the ring gear surfaces 92 may taper toward each other in a direction toward the distal shaft ends to facilitate assembly and mating contact.

The differential casing 22 as shown in FIG. 2 also includes an annular speed sensing gear 94 that is mounted on the casing, specifically as shown in FIGS. 4 and 5 within an annular groove 96 (FIG. 3) in the radial flange 32 and also contacted by the annular ring gear 66 in a sandwiched relationship.

After the forming of the first and second casing halves 30 and 32 to the shapes shown in FIG. 3, each casing half is provided such as by machining with four holes 98 through which lubricant can flow to the differential gearing.

While one embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A method for making a differential gear casing for use in a differential housing of a vehicle axle, the method comprising:

flow forming a first blank about an associated central axis to provide a first casing half having a generally hemispherical portion, a shaft journal portion extending from the hemispherical portion adjacent one axial extremity thereof along its central axis, and a radial flange extending from the hemispherical portion adjacent the other axial extremity thereof along its central axis;

forming a second blank about an associated central axis to provide a second casing half having a generally hemispherical portion, a shaft journal portion extending from the hemispherical portion thereof adjacent one axial extremity thereof along its central axis, a radial flange extending from its hemispherical portion at a location toward the other axial extremity thereof along its central axis, and the hemispherical portion including an axial projection having a round cylindrical shape extending axially from the radial flange thereof in a direction away from the journal portion of the second casing half;

forming the first casing half to provide an interior locating surface of a round cylindrical shape adjacent the hemispherical portion thereof;

forming the axial projection of the second casing half to provide an exterior locating surface of a round cylindrical shape;

forming the radial flanges of the first and second casing halves to provide aligned fastener holes into which fasteners can be inserted to secure the casing halves to each other with the locating surfaces thereof contacting each other to provide positioning of the central axes in alignment with each other.

2. A method for making a vehicle axle differential housing gear casing as in claim 1 wherein the second casing half is formed by the process selected from the group consisting of casting, hot forging or flow forming.

3. A method for making a vehicle axle differential housing gear casing as in claim 1 wherein an annular ring gear is mounted on the radial flange of the first casing half to permit rotational driving of the gear casing.

4. A method for making a vehicle axle differential housing gear casing as in claim 3 wherein threaded fasteners are inserted through the fastener holes in the radial flanges of the casings and into the ring gear to secure the radial flanges to each other and to also secure the ring gear to the radial flanges.

5. A method for making a vehicle axle differential housing gear casing as in claim 4 further including forming at least two sets of aligned pinion shaft holes in the first casing half adjacent the radial flange thereof and in the axial projection of the second casing half to respectively receive an associated pair of differential gear pinion shaft ends that are also received by the ring gear.

6. A method for making a vehicle axle differential housing gear casing as in claim 5 wherein the differential gear pinion shaft ends and the ring gear are provided with complementary positioning formations to provide positioning between these pinion shaft ends and the ring gear.

7. A method for making a vehicle axle differential housing gear casing as in claim 6 wherein the complementary positioning formations are provided as oppositely facing flat surfaces on each pinion shaft end and as opposed flat surfaces on the ring gear.

8. A method for making a vehicle axle differential housing gear casing as in claim 1 wherein a rotational speed sensing gear of an annular shape is mounted on the differential gear casing.

9. A method for making a vehicle axle differential housing gear casing as in claim 1 wherein an annular ring gear is mounted on the radial flange of the first casing half to permit rotational driving of the gear casing and wherein a rotational speed sensing gear of an annular shape is mounted on the differential gear casing between the radial flange of the first casing half and the annular ring gear.

10. A differential gear casing for a differential housing of a vehicle axle, the differential gear casing comprising:
  a first flow formed casing half having a generally hemispherical portion extending around an associated central axis and a shaft journal portion extending from its hemispherical portion adjacent one axial extremity thereof along its central axis, a radial flange extending from its hemispherical portion adjacent the other axial extremity thereof along its central axis, and an interior locating surface of a round cylindrical shape formed within the first casing adjacent its radial flange;
  a second casing half having a generally hemispherical portion and including a shaft journal portion extending from the hemispherical portion thereof adjacent one axial extremity thereof along an associated central axis, a radial flange extending from the hemispherical portion at an axially spaced location along its central axis from the journal portion, and an axial projection having a round cylindrical shape extending axially from the radial flange thereof in a direction away from the journal portion of the second casing half and including an exterior locating surface of a round cylindrical shape; and
  aligned fastener holes in the radial flanges of the first and second casing halves into which fasteners can be inserted to secure the casing halves to each other with the locating surfaces thereof contacting each other to provide positioning of the central axes in alignment with each other.

11. A differential gear casing for a differential housing of a vehicle axle as in claim 10 wherein the second casing half is selected from the group consisting of a casting, a forging and a flow formed part.

12. A differential gear casing for a differential housing of a vehicle axle as in claim 10 further including an annular ring gear mounted on the radial flanges of the casing halves to permit rotational driving of the gear casing.

13. A differential gear casing for a differential housing of a vehicle axle as in claim 12 further including threaded fasteners extending through the fastener holes in the radial flanges of the casing halves and into the ring gear to secure the radial flanges to each other and to also secure the ring gear to the radial flanges.

14. A differential gear casing for a differential housing of a vehicle axle as in claim 10 further including at least two sets of aligned pinion shaft holes in the first casing half adjacent the radial flange thereof and in the axial projection of the second casing half, and at least two differential gear pinion shaft ends respectively extending through associated sets of the aligned pinion holes and also received by the ring gear.

15. A differential gear casing for a differential housing of a vehicle axle as in claim 14 wherein the differential gear pinion shaft ends and the ring gear have complementary positioning formations to provide positioning between the pinion shafts and the ring gear.

16. A differential gear casing for a differential housing of a vehicle axle as in claim 15 wherein the complementary positioning formations include oppositely facing flat surfaces on the pinion shaft ends and opposed flat surfaces on the ring gear.

17. A differential gear casing for a differential housing of a vehicle axle as in claim 10 further including a rotational speed sensing gear of an annular shape mounted on the differential gear casing.

18. A differential gear casing for a differential housing of a vehicle axle as in claim 10 further including an annular ring gear mounted on the radial flange of the first casing half to permit rotational driving of the gear casing and a rotational speed sensing gear of an annular shape mounted on the differential gear casing between the radial flange of the first casing half and the annular ring gear.

19. A differential gear casing for a differential housing of a vehicle axle as in claim 18 wherein the radial flange of the second casing half has an outer annular groove that receives the speed sensing gear.

20. A differential gear casing for a differential housing of a vehicle axle, the differential gear casing comprising:
  a flow formed first casing half having a generally hemispherical portion extending around an associated central axis and a shaft journal portion extending from the hemispherical portion adjacent one axial extremity thereof along its central axis, a radial flange extending from the hemispherical portion adjacent the other axial extremity thereof along its central axis, and an interior locating surface of a round cylindrical shape the first casing adjacent its radial flange;
  a second casing selected from the group consisting of a casting, a forging and a flow formed part, the second casing half having a generally hemispherical portion and including a shaft journal portion extending from the hemispherical portion thereof adjacent one axial extremity thereof along an associated central axis, a radial flange extending from its hemispherical portion at an axially spaced location along its central axis from its journal portion, and an axial projection having a round cylindrical shape extending axially from the radial flange thereof in a direction away from the journal portion of the second casing half and including an exterior locating surface of a round cylindrical shape;
  aligned fastener holes in the radial flanges of the first and second casing halves through which fasteners can extend to secure the casing halves to each other with the locating surfaces thereof contacting each other to provide positioning of the central axes in alignment with each other;
  at least two sets of aligned pinion shaft holes in the first casing half adjacent the radial flange thereof and in the axial projection of the second casing half; and
  at least two differential gear pinion shaft ends respectively received by the pinion shaft holes in the first casing half adjacent the radial flange thereof and in the axial projection of the second casing half as well as by the ring gear, and the differential gear pinion shaft ends and the ring gear having complementary positioning formations for providing positioning between the pinion shaft ends and the ring gear.

* * * * *